Aug. 26, 1924.
E. H. REMDE
1,506,136
INDUSTRIAL TRUCK
Filed Jan. 19, 1922    5 Sheets-Sheet 1
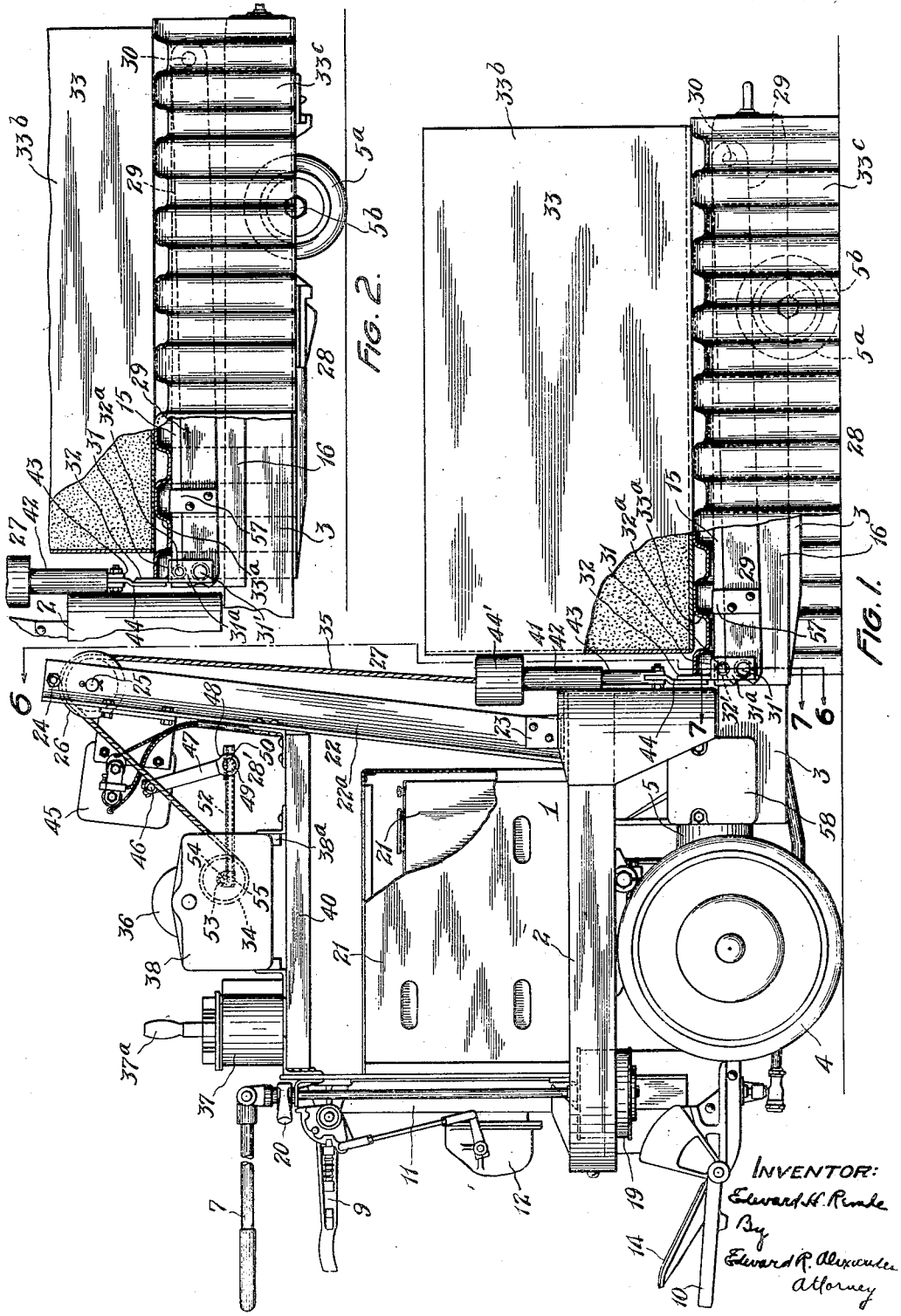

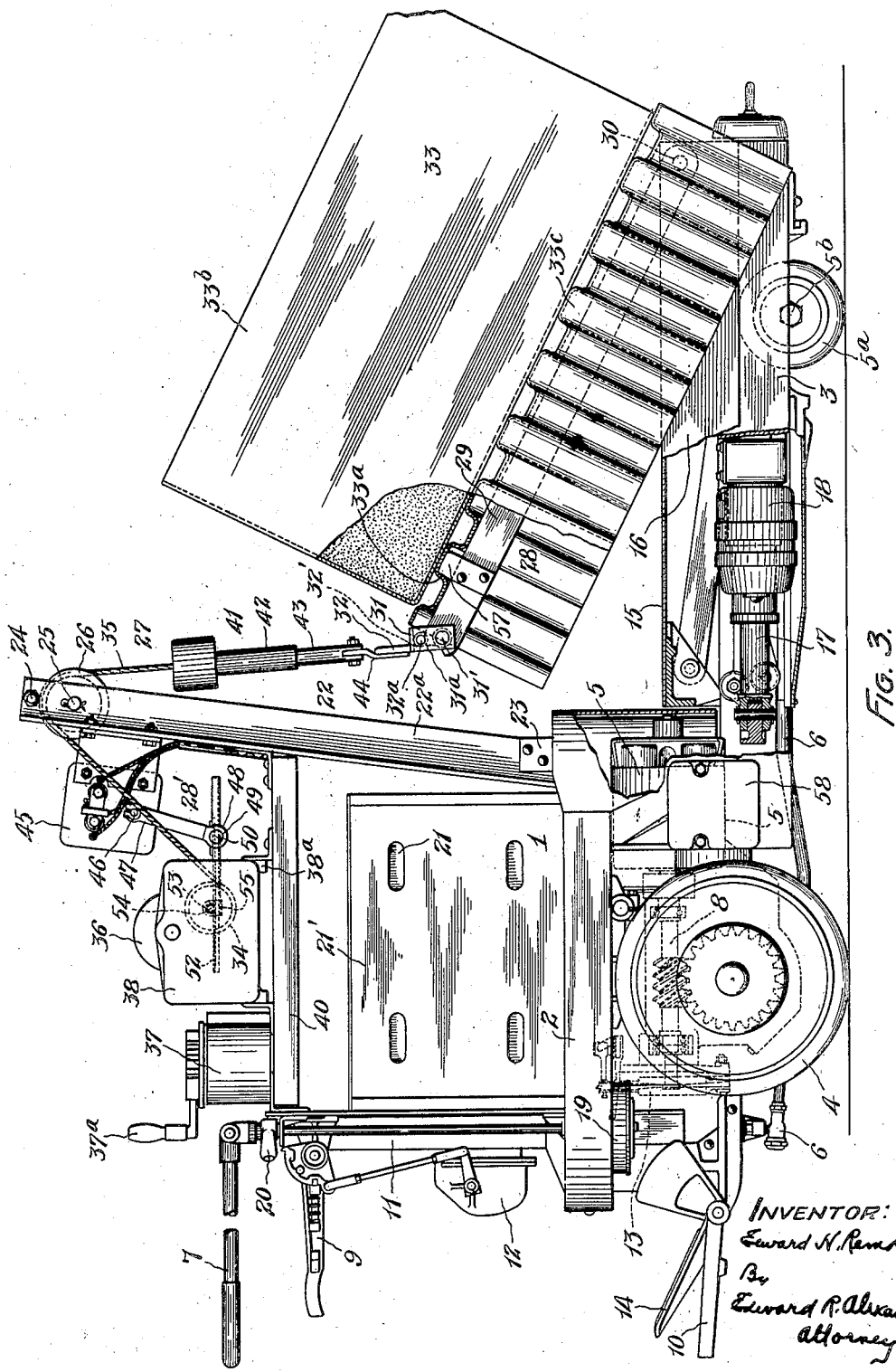

Aug. 26, 1924.
E. H. REMDE
INDUSTRIAL TRUCK
Filed Jan. 19, 1922  5 Sheets-Sheet 3
1,506,136
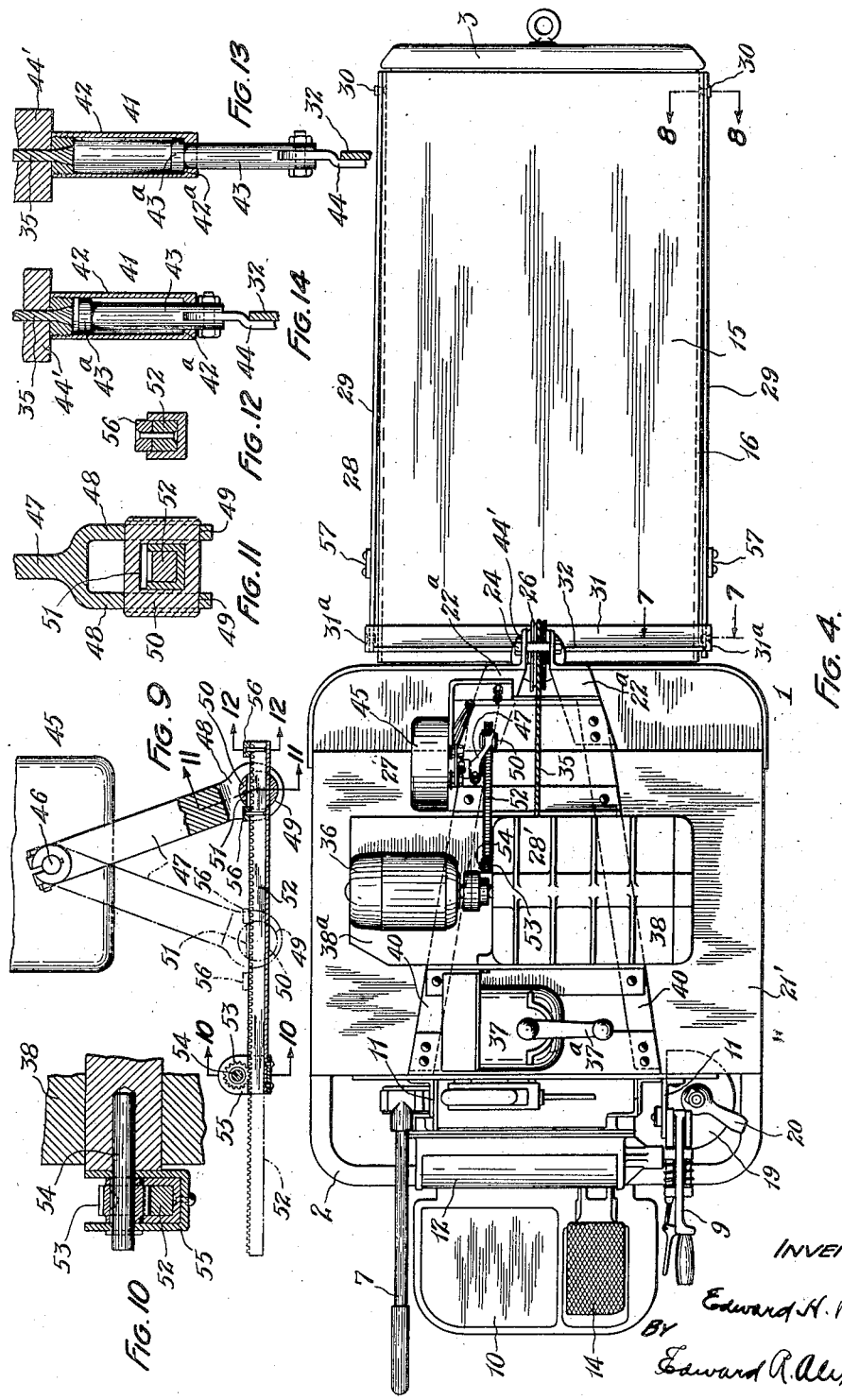
INVENTOR:
Edward H. Remde
BY Edward R. Alexander
ATTORNEY.

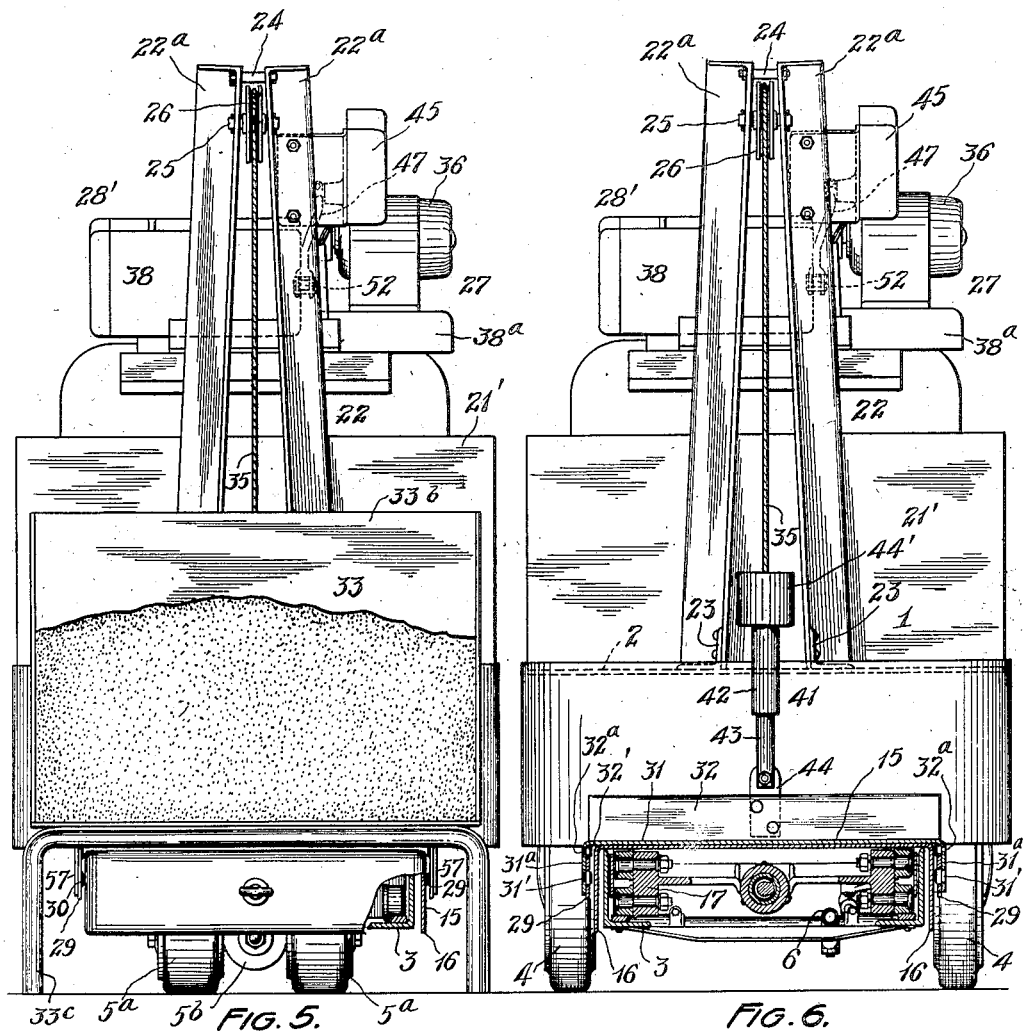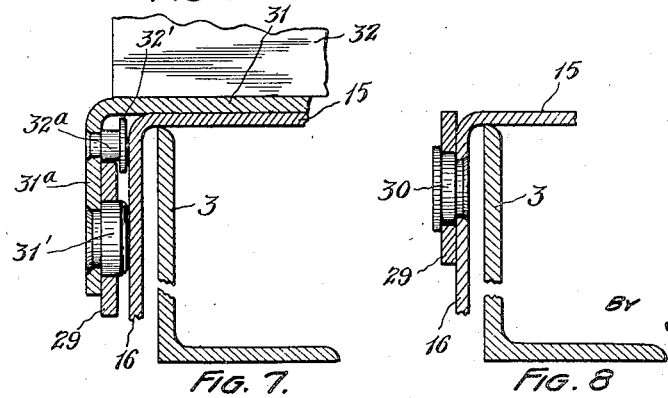

Aug. 26, 1924.

E. H. REMDE

INDUSTRIAL TRUCK

Filed Jan. 19, 1922    5 Sheets-Sheet 5

1,506,136

INVENTOR:
Edward H. Remde
By Edward R. Alexander
Attorney

Patented Aug. 26, 1924.

1,506,136

UNITED STATES PATENT OFFICE.

EDWARD H. REMDE, OF CLEVELAND, OHIO, ASSIGNOR TO THE BAKER R & L COMPANY, OF CLEVELAND, OHIO, A CORPORATION OF OHIO.

INDUSTRIAL TRUCK.

Application filed January 19, 1922. Serial No. 530,460.

*To all whom it may concern:*

Be it known that I, EDWARD H. REMDE, a citizen of the United States, residing at Cleveland, in the county of Cuyahoga and State of Ohio, have invented certain new and useful Improvements in and Relating to Industrial Trucks, of which the following is a specification.

This invention relates to apparatus for transporting and discharging material. The invention is shown as applied to or in connection with an elevating platform type of industrial truck, which permits easy loading of the material, but in its useful applications the invention may be associated with other types of trucks.

One object of the invention is to provide an improved dumping mechanism for trucks, whereby material loaded on or supported by the truck may be readily discharged therefrom.

Another object of the invention is to provide a truck with an improved dumping mechanism having a pivotally mounted dumping member adapted to support a load or engage a load carrying element, whereby the load may be discharged when said member is moved about its pivot.

Another object of the invention is to combine with an elevating platform truck, mechanism for dumping material receivers transported thereby, to the end that the work of loading and transporting as well as dumping of the materials may be rapidly and economically done.

Another object of the invention is to provide an improved combined elevating platform and dumping truck of relatively simple construction.

A further object of the invention is to provide, in a truck of this character, means for locking the dumping member to the receiver, whereby the latter is prevented from sliding off the truck during the dumping operation.

Other objects of the invention will be apparent to those skilled in the art to which this invention relates from the following description taken in connection with the accompanying drawings, wherein I have shown for illustrative purposes the preferred form and application of my invention.

In the drawings, Fig. 1 is a side elevation, with parts broken away, of an elevating, transporting and dumping apparatus embodying my invention.

Fig. 2 is a fragmentary view of parts shown in Fig. 1, but with the platform in elevated position.

Fig. 3 is a side elevation of the apparatus showing the platform elevated and the dumping member in operated position.

Fig. 4 is a plan view of the apparatus (with the receiver removed).

Fig. 5 is a view of the dumping end of the apparatus, part of the receiver and platform being broken away.

Fig. 6 is a section on the line 6—6 of Fig. 1.

Fig. 7 is a section on line 7—7 of Figs. 1 and 4.

Fig. 8 is a section on line 8—8 of Fig. 4.

Fig. 9 is a fragmentary view of the circuit breaking mechanism.

Figures 15, 16:
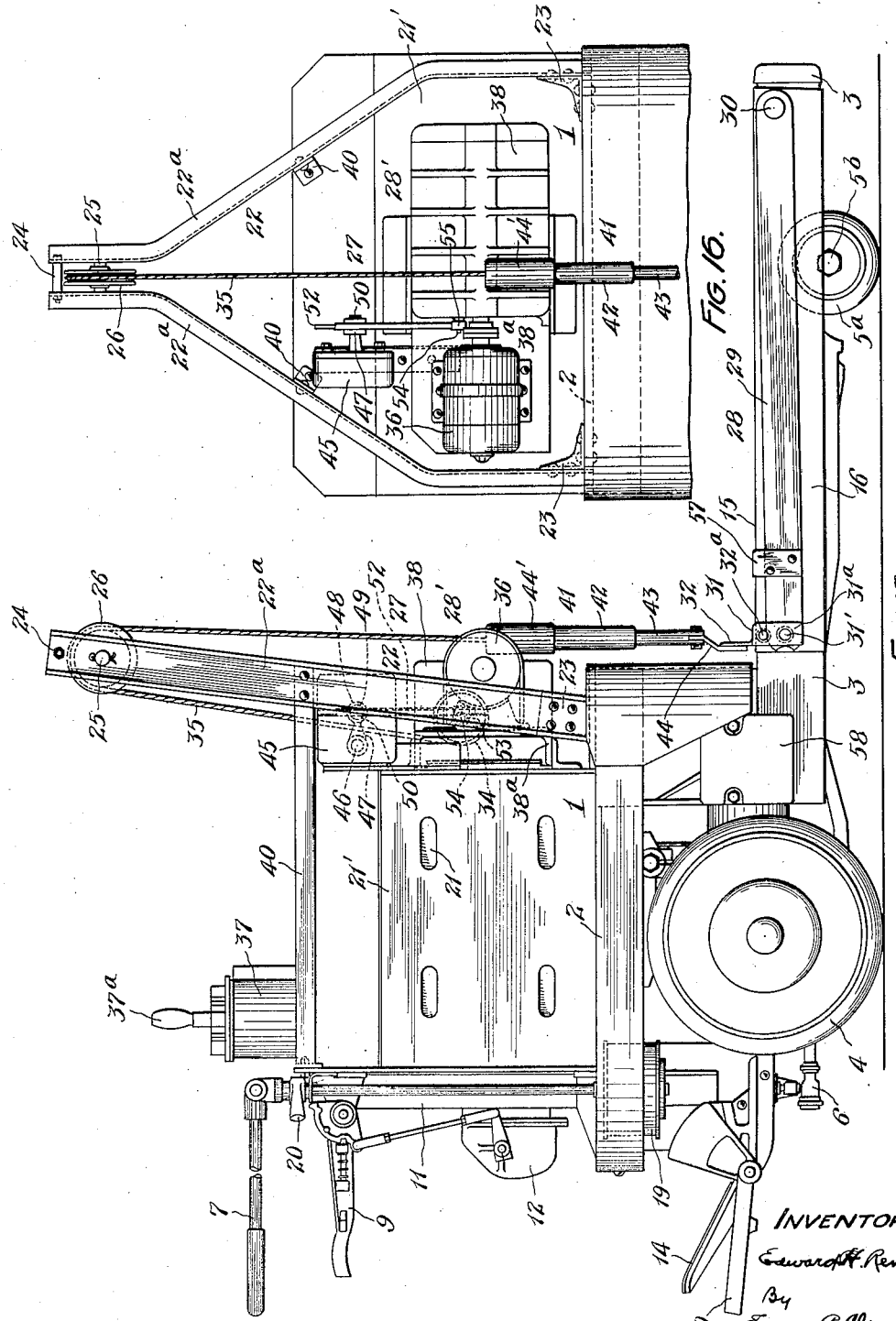

Figs. 10, 11 and 12 are sectional views, enlarged, on the lines 10—10, 11—11 and 12—12 of Fig. 9, respectively.

Fig. 13 is a fragmentary sectional view of the take-up devices between the operating cable and dumping member.

Fig. 14 is a view similar to Fig. 13, but showing the take-up devices in telescopic relation.

Fig. 15 is a side elevation of a slightly modified construction of truck embodying my invention.

Fig. 16 is a fragmentary view of the truck shown in Fig. 15, looking toward the left thereof.

In the drawings, 1 indicates as an entirety a truck frame comprising a main portion 2 and a drop portion 3.

4 indicates a pair of traction wheels driven by a motor—preferably an electric motor—indicated at 5 and preferably steerable by a steering gear 6, which is operated by a handle 7.

The motor 5 transmits its power to the wheels 4 through a driving mechanism indicated as an entirety at 8 (Fig. 3).

$5^a$ indicates a pair of wheels mounted on an axle $5^b$ and disposed below the drop frame portion 3 of the frame 1. The axle $5^b$ is preferably pivoted to the frame and swingable, being connected to and operated by the steering gear 6; accordingly, operation of the handle 7 will swing all four wheels 4, 5ᵃ and thereby cause turning of the truck within a relatively small space or radius.

The handle 7 and also an operating lever 9 are mounted in juxtaposition to each other for easy operation by an operative.

10 indicates a platform on which the operative stands. The handle 7 and lever 9 are supported by uprights 11, or other structural members, connected thereto. The lever 9 is connected to the shaft of a controller drum which is mounted in a casing 12, preferably fixed to the uprights 11, such drum serving to control the electric circuits to the motor 5.

13 indicates one or more braking mechanisms, each arranged to act upon a pulley or band wheel fixed to the driven shaft of the driving mechanism 8. The braking mechanisms 13, either or both, is or are controlled by a foot pedal 14 pivotally supported upon or adjacent the platform 10 in convenient position for the operative to operate.

15 indicates a platform mounted on the drop portion 3 of the frame 1. The platform extends from end to end of the drop portion and is preferably provided with depending sides or flanges 16.

17 indicates as an entirety a raising and lowering mechanism for the platform 15 and interposed between it and the frame portion 3.

18 indicates a motor for operating the raising and lowering mechanism 17. The motor 18 is carried by the frame portion 3 below the platform 15.

19 indicates a controller operated by a handle 20 for controlling the circuits to the motor 18.

21 indicates a battery or plurality of batteries, which supply current to the motors 5 and 18.

The batteries 21 are preferably mounted on the main frame portion 2 of the frame 1. The batteries 21 may be enclosed in a casing 21′.

The parts or elements of the construction so far referred to have been described briefly, as the same are substantially identical in construction and arrangement to the truck or truck construction described and claimed in the co-pending application of John H. Hertner, filed September 10, 1919, Serial No. 322,835, to which reference may be made.

22 indicates a support extending upwardly from the frame 1, being preferably fixed at its lower end to or adjacent the rear edge of the main frame portion 2. The support 22 may comprise a pair of angle plates or beams 22ᵃ, 22ᵃ, disposed endwise, but preferably converging at their upper ends (see Figs. 5 and 6), with their lower ends resting on and secured to the main frame 2 by angles 23. The free ends of the beams 22ᵃ may be connected by a tie 24, which preferably consists of a bolt and a spacing sleeve thereon.

25 indicates a shaft supported at its opposite ends by the beams 22ᵃ near their free ends. The shaft 25 carries a sheave 26, the purpose of which will be later set forth. The sheave 26 is preferably arranged midway between the beams 22ᵃ.

A truck embodying my invention is adapted for many uses where the transporting and dumping of materials or articles are involved. The field of usefulness of the invention is enlarged, where loading operations are required, by its application to or association with an elevating platform type of truck, whereby the loading and transporting from place to place of tables, skids, receivers or other forms of supports (either loaded or unloaded) may be effected. In such use the receiver is supported on spaced legs or side members and the drop frame portion 3 and the platform 15 (the latter being in its lowered position) are run under the receiver; the platform 15 is then raised to clear the legs or side members of the receiver from the floor and while the platform and receiver are in such elevated position, the truck is driven to the place of discharge; the platform 15 is then lowered to permit the receiver to rest on the floor and to disengage the platform from the receiver; the truck is then driven back to the loading station and the operation is repeated, or it may be operated in the same manner to transport an unloaded receiver back to the loading station.

My invention herein has to do with a mechanism, indicated as an entirety at 27, which may engage the receiver, while on the platform 15 and tilt or raise it at one edge, whereby the material in or articles carried by the receiver will be caused to flow or slide there-off on to the floor or into a receptacle (not shown) specially provided to receive the articles or material. Of the dumping mechanism 27, 28 indicates a dumping member pivotally connected to the truck 1 and 28′ indicates as an entirety means for operating the dumping member 28. When the truck is provided with an elevating platform the dumping member 28 is pivoted thereto. When the truck 1 is of the non-elevating platform type, the dumping member 28 may be constructed as hereinafter described or it may itself serve as the platform for the truck and be connected to the truck frame to effect dumping. In the preferred form of construction, which is illustrated in the accompanying drawings, the dumping member 28 comprises a pair of bars 29, 29, each pivoted at one end on a pivot 30 mounted in the adjacent flange 16 of the platform 15 near its outer end, and a connector 31 having depending end members 31ᵃ pivoted at 31′ to the opposite ends of the bars 29 to connect them together. As shown, the bars 29 extend substantially from end to end of the platform 15 to permit the loading thereon of a receiver of maximum size, and when in normal position, the bars 29 are disposed below the surface of the platform 15. The connector 31 overlies the inner end of the platform 15, it preferably resting thereon when the dumping member 28 is in normal or inoperative position, so that the latter will move bodily with the platform in its vertical movements. The connector 31 preferably comprises an angle plate, so that its up-standing wall 32 may serve as a stop to be engaged by the receiver (one preferred type of receiver being indicated as an entirety at 33 in the drawings) when loading is being effected and as a connection element for the operating means 28'.

The bars 29 are arranged relatively close to the outer faces of the flanges 16 and when swung about their pivots 30, they engage the under side of the receiver 33 to tilt it on the platform 15 about its rear end or edge.

By preference the upper edges of the bars 29 adjacent their pivots 30 coincide with the surface of the platform 15 so that the bars 29, when moved upwardly, will engage throughout their entire length the bottom of the receiver.

32$^a$ indicates a device carried by each depending member 31$^a$ and provided with a flange 32' which engages the inner face of the adjacent bar 29, as shown in Fig. 7, to prevent the bar from sliding off of the pivot pin 31' and becoming disconnected from the connecting member 31$^a$ of the operating means 28'.

34 indicates drum on which is wound and unwound a rope or other flexible element 35. 36 indicates a motor, preferably an electric motor, connected or geared to the shaft of the drum 34. The motor is operated in either direction through a controller 37, which in turn is connected in a well known way with the terminals of the batteries 21. The controller is operated by a handle 37$^a$. By preference, the drum 34 and motor 36 are associated together and mounted in a frame 38 and bracket 38$^a$ which may be connected rigidly to the main frame 1 or the rear wall of the casing 21' as shown in Figs. 15 and 16, or it may be carried by a pair of converging angle plates 40 supported at their opposite ends by the beams 22$^a$ and the uprights 11, as shown in Figs. 1, 3, 4, and 5.

The rope 35 extends from the drum 34 over the sheave 26, from which it depends for connection with the dumping member 28, or with the connector 31 thereof, already described.

41 indicates devices interposed in the flexible element 35 and serving as a take-up to permit the raising and lowering of the platform 15 and dumping member 28 therewith without affecting the tautness of the operating element 35 or its position on the sheave 26 and drum 34.

The take-up devices 41 preferably comprise a pair a telescoping members 42, 43, one being connected to the free end of the rope 35 and the other being connected through a link 44 to the up-standing plate 32 (see Figs. 1, 3, 13 and 14). The members 42, 43, loosely fit one within the other, so that when the platform 15 and dumping member 28 are elevated, the inner member (43) slides upwardly within the outer member (42) as shown in Fig. 13. The inner end of the member 43 is provided with a head 43$^a$ and the outer end of the member 42 is contracted to form a shoulder 42$^a$ arranged to be engaged by the head 43$^a$, so that when the rope 35 is wound on the drum 34, the members 42, 43, will remain connected and serve to transmit the pull on the rope to tilt or lift the dumping member 28—see Fig. 3.

44' indicates a weight carried by the rope 35 and serving to keep it taut at all times. The weight 44' is preferably formed with central opening through which the rope 35 extends. The weight rests upon the telescoping member 42, as shown in Figs. 13 and 14 and is carried upwardly and downwardly therewith. The weight also serves to maintain the telescoping member 42 against upward movement, due to any friction which may exist between the members 42, 43, and which would prevent relative movement of said members when the platform 15 and dumping member 28 are elevated, thereby insuring that the members 42, 43 will effect a take-up in the connection from the drum 34 to the dumping member 28 due to the raising of the latter.

45 indicates a mechanism for breaking the circuit to the motor 18 when the dumping member 28 moves to (a) its lowest most position with the connector 31 in engagement with the platform 15 or (b) to its extreme position in the opposite direction— see Fig. 3.

The circuit breaking mechanism 45 is preferably similar in construction to like elements shown, described and claimed in my co-pending application, Serial No. 523,286, filed Dec. 12, 1921; but to permit its adaptation to the herein disclosed construction and arrangement of dumping mechanism 27, the rock shaft 46 of the circuit breaking mechanism 45 is provided with an arm 47 having bifurcations 48 at its outer end. The bifurcations 48 are formed with aligned openings 49 which form bearings for the opposite ends of a rocker 50. That portion of the rocker 50 disposed between the bifurcations 48 is formed with a slot or opening 51 (preferably of rectangular shape), in which is mounted one end of a rack 52. The rack 52 engages a pinion 53 fixed on the extended end of the drum shaft or a pin 54 carried thereby, the rack 52 being held in such engaging position by a guide 55. The guide 55 is U-shaped, the pinion 53 and rack 52 being arranged between its legs and the latter being formed with aligned openings to receive the shaft or pin 54. By this latter arrangement, means are provided for supporting the guide 55 in a manner which permits it to swing about the axis of the pinion 53, whereby the guide may accommodate itself to the positions assumed by the rack 52 due to the swinging movements of the arm 47.

The rotation of the drum 34 in winding up or paying out the rope 35 rotates the pinion 53 which in turn moves the rack 52 endwise in one direction to the position shown in Fig. 9. The rack will swing the arm 47, which in turn will cause the circuit breaking mechanism 45 to open the circuit to the motor 18, stopping the latter. Operation of the drum 34 in the opposite direction will effect the swinging of the arm 47 to the position shown in dotted lines in Fig. 9, thereby opening the circuit which controls the driving of the motor in that direction. The rack 53 is provided with a pair of spaced lugs 56 disposed on opposite sides of the rocker 50 and serve to connect the arm 47 to the rack 52, so that the movement of the latter will be transmitted to the arm. The operating elements described, between the drum shaft and the rock shaft 46 are proportioned for co-operation to effect the breaking of either circuit at a predetermined position of the dumping member 28 when it moves in either direction. These elements may be changed, when adjustment of either circuit breaking position is required, or the lugs 56 may be spaced apart to permit limited movement of the rack 52 relative to the arm 47 before operation of the latter.

57 indicates a device carried by one element of the dumping mechanism 27 and arranged to engage the receiver disposed above the dumping member 28 and maintain it thereon and hold or lock it against movement relative thereto during the tilting or dumping operation. The locking device 57 is preferably carried by the dumping member 28. I may provide two such devices, one carried by each bar 29. Each locking device 57 consists of a plate fixed to the adjacent bar 29 and projecting upwardly therefrom for engagement with or disposition in front of a wall 33ª carried by the receiver 33. As shown in Fig. 1, the bars 29 are normally disposed in a downwardly inclined position, so that the locking members or devices 57 are below the surface of the platform 15 and do not form an obstruction when the loading operation is carried out, but when the operating mechanism 28' is operated to raise the dumping member 28, the locking devices 57 will be carried upwardly into position in front of the wall or walls 33ª. As the dumping member 28 continues to move upwardly it will incline the receiver 33 at an angle to the horizontal, but due to the engagement of the wall 33ª with the devices 57, movement of the receiver 33 relative to the dumping member 28 will be prevented.

The locking devices 57 are positioned at a predetermined distance from the up-standing wall 32 and the wall 33ª on the receiver 33 is so positioned that when the inner end of the receiver abuts such wall in loading, the wall 33ª will be in position to engage the locking devices 57 when the latter are raised by the movement of the bars 29 upwardly.

The receiver 33 shown for illustrative purposes, comprises a receptacle 33ᵇ having side walls and a bottom and a support 33ᶜ, to which the bottom of the receptacle is secured in any desired manner. The support consists of a corrugated sheet of metal bent downwardly transversely to the corrugations along lines substantially coinciding with side edges of the receptacle bottom to form supporting legs for the receptacle. The corrugations serve to strengthen and reinforce the receptacle and form relatively strong legs therefor, and one thereof serves as the wall 33ª for engagement with the locking devices 57.

While the invention is not limited to a receptacle of the construction shown, the advantages of using a receptacle having a corrugated support will be obvious, especially as the corrugations serve as the wall with which the bars 29 engage and at the same time provide a co-operating locking wall 33ª without making special provision therefor. Furthermore, the corrugations may serve as additional locking walls if it was found desirable to change the position of the devices 57 or increase the number thereof.

The circuits for the motor 18 may be opened automatically at the limit of movement of the platform 15 in either direction by a circuit breaking mechanism 58, similar in construction to the mechanism already described or referred to in connection with the operating means 28'.

In Fig. 1 I have shown the truck 1 in position to effect loading of a receptacle 33, the latter being filled with material and ready to be transported to the dumping station, the truck with its platform in lowered position having been run under the receptacle.

Fig. 2 illustrates the receptacle 33 loaded on the truck, such operation being effected by elevating the platform 15.

Fig. 3 illustrates the operation of dumping the receptacle by the raising of its inner end, such operation making it unnecessary to unload the receptacle from the truck or truck platform before emptying the receptacle.

From the foregoing description it will be seen that a truck embodying my invention is capable of transporting materials and dumping them in a rapid and easy manner, thereby securing more economical operations by a saving in labor and time required therefor.

It will also be seen that the operations of the truck, the dumping of the load and the return of the receiver to the loading station are effected by a single operative and without changing his position from or getting off the platform 10.

To those skilled in the art to which my invention relates, many changes and alterations and widely differing embodiments of the invention will suggest themselves without departing from the spirit and scope thereof. It will therefore be understood that the illustrations and descriptions herein are purely illustrative and are not intended to be in any sense limiting.

What I claim is:

1. In apparatus of the class described, the combination of a truck frame having an elevating platform thereon arranged to removably receive a support or holder, wheels for supporting said frame, devices disposed at opposite sides of said platform and movable upwardly to engage the ends of the support or holder projecting laterally beyond said elevating platform to tilt it, and means on said frame for operating said tilting devices.

2. In apparatus of the class described, the combination of a truck frame having a main section and a relatively low section, wheels for said frame, a platform mounted to move vertically relative to said low frame section, whereby the platform may be positioned under a load support or holder and the latter lifted, and means movable relative to said low frame section and arranged to engage the load support or holder on the platform to tilt it relative to said platform.

3. In apparatus of the class described, the combination of a truck frame having a main section and a relatively low section, wheels for said frame, a platform mounted to move vertically relative to said low frame section, whereby the platform may be positioned under a load support or holder and the latter lifted, and means mounted on and movable relative to said platform and arranged to engage the load support or holder thereon to tilt it relative to said platform.

4. In apparatus of the class described, the combination of a truck frame having a main section and a relatively low section, wheels for said frame, a platform mounted to move vertically relative to said low frame section, whereby the platform may be positioned under a load support or holder and the latter lifted, means movable relative to said low frame section and arranged to engage the load support or holder on said platform to tilt the support or holder relative to said platform, and means on said frame operatively connected with said tilting means for operating it.

5. In apparatus of the class described, the combination of a truck frame having a main section and a relatively low section, wheels for said frame, a platform mounted to move vertically relative to said low section, whereby the platform may be positioned under a load support or holder and the latter lifted, means mounted on and movable relative to said platform and arranged to engage the load support or holder to tilt it relative to said platform, and means on said frame operatively connected to said tilting means for operating it.

6. In apparatus of the class described, the combination of a truck frame, wheels for supporting said frame, an elevating member mounted to move relative to said frame, a device movably mounted on said elevating member arranged to dump a load thereon, and mechanisms carried by said frame for operating said member and said device each independently of the other.

7. In apparatus of the class described, the combination of a truck frame, wheels for supporting said frame, an elevating member mounted to move relative to said frame, a device movably mounted on said elevating member arranged to dump a load thereon, a mechanism carried by said frame for operating said member, a separate mechanism carried by said frame for operating said device, and a take-up in said separate mechanism for preventing dis-arrangement thereof when said elevating member is operated.

8. In apparatus of the class described, the combination of a truck frame having a load supporting section, wheels for supporting said frame, a load dumping device pivotally mounted on said load supporting section, a mechanism carried by said frame for operating said device to engage the load support and tilt it into dumping position, and an element moved by said device into engagement with the load support to prevent endwise movement thereof during the tilting movement.

9. In apparatus of the class described, the combination of a truck frame on which a material supporting or holding member may be loaded, wheels for supporting said frame, means movably mounted on said frame arranged to engage and tilt the material supporting or holding member, and a device carried by said tilting means normally disposed in an inoperative position to permit loading of the supporting or holding member on said frame but arranged to engage the member as said means operate to maintain it against movement relative to said tilting means during the tilting operation.

10. In apparatus of the class described, the combination of a truck frame on which a material supporting or holding member having a locking wall may be loaded, wheels for supporting said frame, means comprising a pair of spaced devices pivotally mounted at corresponding ends on said frame arranged to engage and tilt the material supporting or holding member, and an element on one of said tilting devices normally disposed in an inoperative position to permit loading of the supporting or holding member on said frame but arranged to engage the locking wall of the member as said devices operate to maintain the member against endwise movement relative to said tilting devices during the tilting operation.

11. In apparatus of the class described, the combination of a truck frame on which a material supporting or holding member having a locking wall may be loaded, wheels for supporting said frame, means comprising a pair of spaced devices pivotally mounted at corresponding ends on said frame arranged to engage and tilt the material supporting or holding member and a connector between said devices, an element on one of said tilting devices normally disposed in an inoperative position to permit loading of the supporting or holding member on said frame but arranged to engage the locking wall of the member as said devices operate to maintain the member against endwise movement relative to said tilting devices during the tilting operation, and means including a flexible member connected to said connector for operating said tilting means.

12. In apparatus of the class described, the combination of a truck frame, wheels for supporting said frame, an elevating member mounted to move relative to said frame, a device movably mounted on said elevating member, a mechanism carried by said frame for operating said member, operating means including a drum mounted on said frame, and a flexible member arranged to wind on and off said drum and connected at its free end to said device to move the latter on said elevating member.

13. In apparatus of the class described, the combination of a truck frame, wheels for supporting said frame, an elevating member mounted to move relative to said frame, a load dumping device movably mounted on said elevating member, a mechanism carried by said frame for operating said member, operating means, including a drum mounted on said frame, a flexible member arranged to wind on and off said drum and connected at its free end to said device to move the latter relative to said elevating member, and a take-up interposed in said flexible member operating to prevent dis-arrangement of said flexible member when said elevating member is operated.

14. In apparatus of the class described, the combination of a truck frame, wheels for supporting said frame, an elevating member mounted to move relative to said frame, a load dumping device movably mounted on said elevating member, a mechanism carried by said frame for operating said member, operating means, including a drum mounted on said frame, a flexible member arranged to wind on and off said drum and connected at its free end to said device to move the latter relative to said elevating member, and a pair of relatively movable connected devices interposed in said flexible member for preventing dis-arrangement thereof when said elevating member is operated.

15. In apparatus of the class described, the combination of a truck frame, wheels for supporting said frame, an elevating member mounted to move relative to said frame, a load dumping device movably mounted on said elevating member, a mechanism carried by said frame for operating said member, operating means, including a drum and a sheave, mounted on said frame and a flexible member arranged to wind on and off said drum and running over said sheave and connected at its free end to said device to move the latter relative to said elevating member, and a weight carried by said flexible member adjacent its connection with said device to keep said flexible member taut during movement of said elevating member.

16. In apparatus of the class described, the combination of a truck frame, wheels for supporting said frame, an elevating member mounted to move relative to said frame, a load dumping device movably mounted on said elevating member, a mechanism carried by said frame for and operating said member, operating means, including a drum and a sheave, mounted on said frame, a flexible member arranged to wind on and off said drum and running over said sheave and a pair of relatively movable connected elements, one connected to the free end of said flexible member and the other connected to said device and serving as a take-up during movement of said elevating member.

17. In apparatus of the class described, the combination of a truck frame, wheels for supporting said frame, an elevating member mounted to move relative to said frame, a load dumping device movably mounted on said elevating member, a mechanism carried by said frame for operating said member, operating means, including a drum and a sheave, mounted on said frame, a flexible member arranged to wind on and off said drum and running over said sheave and a pair of relatively movable connected elements, one connected to the free end of said flexible member and the other connected to said device and serving as a take-up during movement of said elevating member, and a weight carried by the element connected to said flexible member.

18. In apparatus of the class described, the combination of a truck frame having a vertically movable member adapted to be disposed below a load support or holder, wheels for supporting said frame, means movable relative to said frame for tilting the support or holder on said movable member, and a device carried by and movable with said tilting means into engagement with the support or holder when said means operate for maintaining the support or holder against endwise movement during the tilting operation.

19. In apparatus of the class described, the combination of a truck frame having a vertically movable member adapted to be disposed below a load support or holder, wheels for supporting said frame, means movable relative to said frame for tilting the support or holder on said movable member, a device arranged to be moved by said tilting means into engagement with the support or holder when said means operate for maintaining the support or holder against endwise movement during the tilting operation, and a device on said tilting means for limiting the movement of said member below the load support or holder, whereby the latter is aligned with said maintaining device.

20. In apparatus of the class described, the combination of a truck frame adapted to removably support a material holder, wheels for said frame, a dumping member pivotally connected to said frame and swingable upwardly, said member being arranged below a portion of the holder positioned on said frame so as to engage therewith and dump it as said member swings upwardly, and a device carried by said member arranged to engage the holder to prevent endwise movement thereof during the dumping operation.

21. In apparatus of the class described, the combination of a truck having a frame adapted to removably support a receiver, dumping mechanism including a member pivotally connected to said truck and arranged to engage the receiver to dump it, said member comprising a pair of spaced bars and a connector for connecting the bars together, and means carried by one of said bars for engaging the receiver to prevent its endwise movement relative to said member when the latter is operated.

22. In apparatus of the class described, the combination of a truck having elevating means, a receiver having an engaging wall arranged to be loaded on said elevating means, mechanism for operating said elevating means, dumping mechanism including a member swingable relative to the frame of said truck and arranged to engage said receiver to tilt it, said member comprising a pair of spaced bars, and a device carried by one of said bars and arranged to engage said wall as the bar swings upwardly to prevent movement of the receiver relative to said member during its operation.

23. In apparatus of the class described, the combination of a truck having elevating means, mechanism for operating said elevating means, dumping mechanism including a member swingable relative to said truck and arranged to engage a receiver to tilt it on said elevating means, a power driven drum, a flexible member connected to said swingable member and arranged to be wound on and unwound off said drum, and a take-up device in said flexible member.

In testimony whereof I affix my signature, in the presence of two witnesses.

EDWARD H. REMDE.

Witnesses:
E. C. DUNCAN,
E. J. SCOVIL.